US012602247B2

(12) United States Patent　　　　(10) Patent No.:　US 12,602,247 B2
Brinkhoff et al.　　　　　　　　　　(45) Date of Patent:　　Apr. 14, 2026

(54) HANDOFF OF EXECUTING APPLICATION BETWEEN LOCAL AND CLOUD-BASED COMPUTING DEVICES

(71) Applicant: Microsoft Technology Licensing, LLC, Redmond, WA (US)

(72) Inventors: Christiaan Brinkhoff, Woodinville, WA (US); Prasanna Chromepet Padmanabhan, Redmond, WA (US); Sandeep Patnaik, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 614 days.

(21) Appl. No.: 17/976,588

(22) Filed: Oct. 28, 2022

(65) Prior Publication Data

US 2024/0143387 A1　　May 2, 2024

(51) Int. Cl.
　　*G06F 9/46*　　　　(2006.01)
　　*G06F 9/48*　　　　(2006.01)
　　*G06F 11/32*　　　(2006.01)

(52) U.S. Cl.
　　CPC .......... *G06F 9/4856* (2013.01); *G06F 9/4887* (2013.01); *G06F 11/328* (2013.01)

(58) Field of Classification Search
　　CPC ..... G06F 9/4856; G06F 9/4887; G06F 11/328
　　See application file for complete search history.

(56) References Cited

U.S. PATENT DOCUMENTS

| | | |
|---|---|---|
| 2008/0126511 A1 | 5/2008 | Appaji |
| 2013/0132457 A1* | 5/2013 | Diwakar ................. H04L 67/10 |
| | | 709/201 |
| 2015/0128131 A1 | 5/2015 | Cao et al. |
| 2017/0053110 A1 | 2/2017 | Wang et al. |
| 2020/0192689 A1* | 6/2020 | Smith, IV ........... G06F 9/45558 |

FOREIGN PATENT DOCUMENTS

WO　　　2005109829 A1　　11/2005

OTHER PUBLICATIONS

Gember, et al., "ECOS: Leveraging Software-Defined Networks to support mobile application offloading", IEEE, Oct. 29, 2012, pp. 199-210.
International Search Report and Written Opinion received for PCT Application No. PCT/US23/031946, mailed on Nov. 22, 2023, 18 pages.
International Preliminary Report on Patentability (Chapter 1) received for PCT Application No. PCT/US2023/031946, May 8, 2025, 11 pages.

* cited by examiner

*Primary Examiner* — Gregory A Kessler

(57)　　　　　　　　ABSTRACT

Systems and methods are provided for handing off execution of an application from a local computing device to a cloud-based computing device. The disclosed technology is directed to determining whether and when to initiate handing off the execution of the application based on monitoring resource consumption of the local computing device. When the application is not previously installed on the cloud-based computing device, the local computing device transmits an application installer executable to the cloud-based computing device for enabling use of the same application on the cloud-based computing device.

14 Claims, 13 Drawing Sheets

Handoff Processor 202

Resource usage data retriever 210

Handoff determiner 212

Cloud-based computing device locater 214

Application Installer transmitter 216

Virtual desktop launcher 218

200A

300

| Monitored resources | Usage Percentage/Status |
|---|---|
| Processor 302 | 75% |
| Volatile Memory 304 | 75% |
| Non-volatile Memory 306 | 75% |
| Workload of Graphics Processing Unit 308: | 75% |
| Remaining Battery Level 310 : | 20% |
| Network Latency Status 312 : | High |
| Network Connectivity State 314 : | OPEN |

FIG. 3

HANDOFF OF EXECUTING APPLICATION BETWEEN LOCAL AND CLOUD-BASED COMPUTING DEVICES

BACKGROUND

It has become a commonplace to use cloud resources for accessing application services that are complex and resource-intensive, while using a local computing device for performing tasks that can be processed using local resources. Cloud computing provides an effective way for performing computation requiring more resources than may be available locally, for example, when a user is operating several applications at the same time and/or using applications that simply use or consume large amounts of memory or processor time, the computations of locally operating applications can cause a shortage of local resources. Cloud systems also provide potential data storage benefits as well.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a system for handing off execution of an application from a local computing device to a cloud-based computing device. In particular, the disclosure is directed to determining when to cause such a handoff. Aspects relate to a "handoff determiner" that periodically monitors the status of resource usage on the local computing device, as the local computing device executes one or more applications for performing various tasks. The handoff determiner determines whether continued use of the local computing device is preferred, or if it is better to transition execution of the application from the local computing device to the cloud-based computing device. Other aspects relate to automatically installing an application on the cloud-based computing device to handle the handoff, when the application has not been previously installed on the cloud-based computing device. Other aspects relate to handing off execution of an application that is executing on a cloud-based computing device to a local computing device.

According to aspects, monitoring of local resource consumption includes monitoring processor workload, memory consumption, speed of accessing local memory resources, degree of availability of a graphical processing unit and/or accelerator hardware, and remaining battery level of the local computing device. Other monitoring may include monitoring based on a predefined set of rules associated with network security requirements and/or network latency, e.g., a minimal latency needed by local applications.

Based on the monitoring results, the handoff determiner may determine that a handoff of the application from the local computing device to the cloud-based computing device should occur. In some embodiments, the handoff may occur while the application is executing. In other embodiments, the handoff may occur upon receiving a request to launch or open the application. Still other embodiments are contemplated, such as wherein a handoff of control of an application may occur during installation of the application itself.

Given that a successful handoff requires that the application be installed on the cloud-based computing device, embodiments will ascertain the availability of the application on the cloud-based computing device prior to initiating the handoff. When the application has not been installed on the cloud-based computing device, a handoff processor may effectuate the installation of the application. The handoff processor may locate a necessary installer executable associated with the application and transmit the installer executable to the cloud-based computing device for installation in the cloud. Additionally, or alternatively, the handoff processor causes the cloud-based computing device to install the application from a cloud application store on the cloud-based computing device.

Similar to the handoff from the local computing device to the cloud-based computing device, a handoff of an application may occur in the other direction—i.e., from the cloud-based computing device to the local computing device. An example of when a hand-off from the cloud-based computing device to the local device may occur includes situations where a network latency is unacceptable, e.g., to the extent that responsiveness of the user interface becomes too slow. Another example occurs when the network becomes unavailable or if the local device needs to be used off-line. Yet another example may include when computing resources that are allocated the cloud-based computing device become insufficient. Those skilled in the art will appreciate that other examples may exist, such as for security reasons or the like.

When the application is installed on the cloud-based computing device, aspects of the disclosed technology relate to automatically handing off execution of the application to the cloud-based computing device. Other aspects relate to displaying a notification to the user of the local computing device that a handoff of the application from the local computing device to the cloud-based computing device is recommended, such that the user may control whether to perform the handoff or not.

When a handoff of the execution of the application occurs, the handoff processor causes the storing of application file data associated with the application, e.g., from the local memory, in a cloud data repository for retrieval by the cloud-based computing device after the handoff. For example, the file data may relate to a current file to be used or edited with the application. The handoff processor further instructs the cloud-based computing device to launch the application in the cloud and to retrieve the application file data from the cloud data repository.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 1 illustrates an overview of an example system for a handoff of execution of an application from a local computing device to a cloud-based computing device in accordance with aspects of the present disclosure.

FIGS. 2A-B illustrate an overview of an example system and an example flow diagram for a handoff of execution of an application from a local computing device to a cloud-based computing device in accordance with aspects of the present disclosure.

FIG. 3 illustrates an example data structure associated with monitoring resource states of a local computing device in accordance with aspects of the present disclosure.

FIGS. 4A-C illustrate example user interfaces for a handoff of execution of an application from a local computing device to a cloud-based computing device in accordance with aspects of the present disclosure.

FIGS. 5A-C illustrate examples of methods for a handoff of execution of an application from a local computing device to a cloud-based computing device in accordance with aspects of the present disclosure.

DETAILED DESCRIPTION

Figure 1:
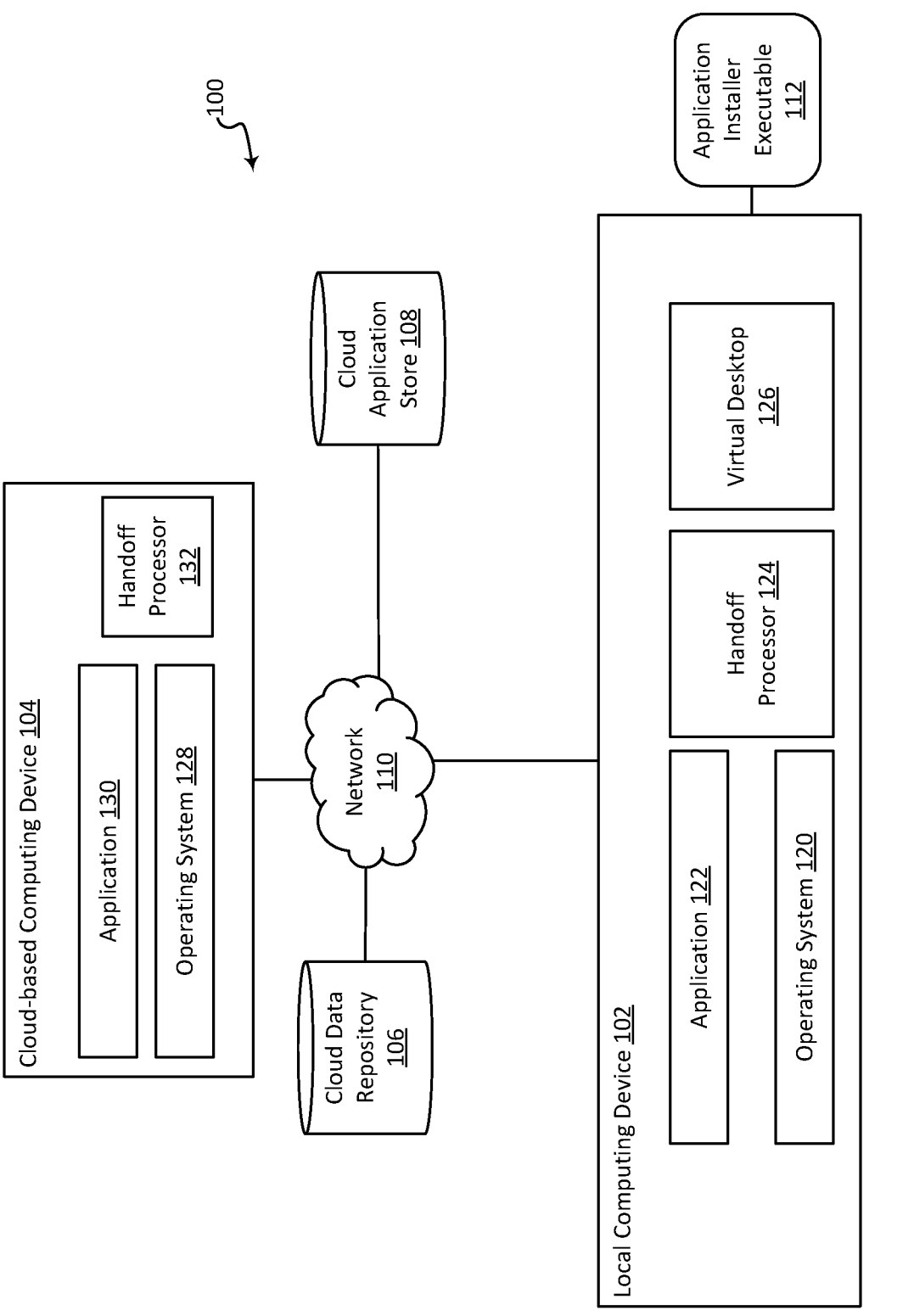

Various aspects of the disclosure are described more fully below with reference to the accompanying drawings, which form a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

The present disclosure relates to a handoff or a transition of execution of an application between a local computing device and a cloud-based computing device. In particular, the disclosed technology is directed to determining whether to initiate a handoff between the local computing device and a cloud-based computing device. The determination of whether to initiate the handoff is based on various aspects including a state of computing resources being consumed on the local computing device and/or predefined conditions associated with data security and performance of a network. While the disclosure discusses the handoff from the local computing device to the cloud-based computing device, other embodiments are contemplated wherein the handoff of execution of an application occurs from the cloud-based computing device to the local computing device. In some embodiments, multiple handoffs may occur throughout the execution of an application, depending on conditions.

The determination as to whether to initiate a handoff is based on the current state of resource consumption and security policy compliance by the local computing device. The handoff may occur at different times and/or in different situations. For instance, the handoff may occur while an application is in use (i.e., executing) on the local computing device. In other situations, the handoff may occur during the launch or start of an application. The handoff determiner determines whether to open or launch the application on the local computing device or notify the user that the cloud-based computing device will be used to launch the application. In yet other embodiments, the handoff may occur at a time of application installation, as discussed below.

Some embodiments provide the user with a handoff option and allow the user to approve of such a handoff. In other embodiments, the system may automatically handoff the execution of the application without user input. The present disclosure relates, in part, to automatically determining when to use a cloud-based computing device and efficiently transition to using the cloud-based computing device. In aspects, the cloud-based computing device uses a virtual machine to execute the same or a substantially equivalent application as the local computing device. A virtual desktop associated with the cloud-based computing device and displayed on the local computing device provides substantially the same level of functionality as the desktop of the local computing device. Furthermore, the disclosed technology uploads working data, also referred to as application file data, associated with the application to a cloud data repository before the handoff from the local computing device to the cloud-based computing device takes place. The application on the cloud-computing device reads the application file data from the cloud storage to enable the user to continue use of the same application on the cloud-based computing device.

FIG. 1 illustrates an overview of an example system for a handoff of an application from a local computing device to a cloud-based computing device in accordance with aspects of the present disclosure. System 100 includes local computing device 102, cloud-based computing device 104, cloud data repository 106, cloud application store 108, and network 110 that interconnects the aforementioned parts.

The local computing device 102 includes operating system 120, application 122, handoff processor 124, and virtual desktop 126. The local computing device 102 further connects to application installer executable 112. The application installer executable 112 includes an installer for the application 122. The operating system 120 provides an interactive user interface to a user of the local computing device 102 and controls input and output associated with the local computing device 102. The application 122 relates to any local computer application that consumes resources, as will be understood by those skilled in the art. Specific examples of the application 122 that may benefit from embodiments described herein include image drawing applications, video editing applications, and the like, given their potential heavy resource usage. Those skilled in the art will appreciate that many different applications may benefit from the handoff of execution as described herein such that these are merely examples and are by no means exhaustive or limiting.

The handoff processor 124 monitors a status of resource consumption and other data in the local computing device 102 and determines whether to handoff the execution of the application 122 from the local computing device 102 to the cloud-based computing device 104. The virtual desktop 126 displays a virtual desktop (e.g., a remote desktop) generated by and/or associated with the cloud-based computing device 104.

The cloud-based computing device 104 includes operating system 128 and application 130. Similar to the local computing device 102, the cloud-based computing device 104 executes the operating system 128, which controls input and output associated with the cloud-based computing device 104 and executes the application 130. As discussed herein, the application 122 and the application 130 are suitably equivalent such that the functionality is substantially similar during execution. In some examples, application 130 is a cloud-based version of the application 122 described above. Those skilled in the art will appreciate that in many embodiments, the version of the application 130 on the cloud-based computing system corresponds to the version of the application 122 on the local computing device. The operating system 128 of the cloud-based computing device 104 generates an interactive user interface and provides the application 130 for interactive display through the virtual desktop 126 on the local computing device 102.

The cloud data repository 106 stores data, e.g., application file data used by both the application 122 on the local computing device 102 and the application 130 on the cloud-based computing device 104. The cloud application store 108 stores installer executables of applications operable in the cloud. For example, in some embodiments, the cloud-based computing device 104 downloads an application installer from the cloud application store 108 for installing the application 130. Additionally, or alternatively, the cloud-based computing device 104 may receive the application installer executable 112 from the local computing device 102 over the network 110 for installing the application 130.

In other embodiments, a handoff processor 132 is located on the cloud-based computing device and it may be used to control the handoff operation. In an embodiment, handoff processor 132 may coordinate the handoff of the application 130 executing on the cloud-based computing device 104 to the local computing device 102. When the handoff processor 132 recognizes of certain status conditions warrant a handoff of execution from the cloud-based computing device to the local computing device, e.g., when network latency is too high, then the handoff of execution of the application 130 will occur. In such a case, the application 122 will be launched and begin executing on the local computing device 102. The file or related memory required is relayed to the local computing device to allow for the handoff of execution. Those skilled in the art will appreciate that different components may be used to monitor relevant status of resources and communicate whether it is preferred to initiate a handoff from one device to the other.

As will be appreciated, the various methods, devices, applications, features, etc., described with respect to FIG. 1 are not intended to limit the system 100 to being performed by the particular applications and features described. Accordingly, additional controller configurations may be used to practice the methods and systems herein and/or features and applications described may be excluded without departing from the methods and systems disclosed herein.

Figure 2A:
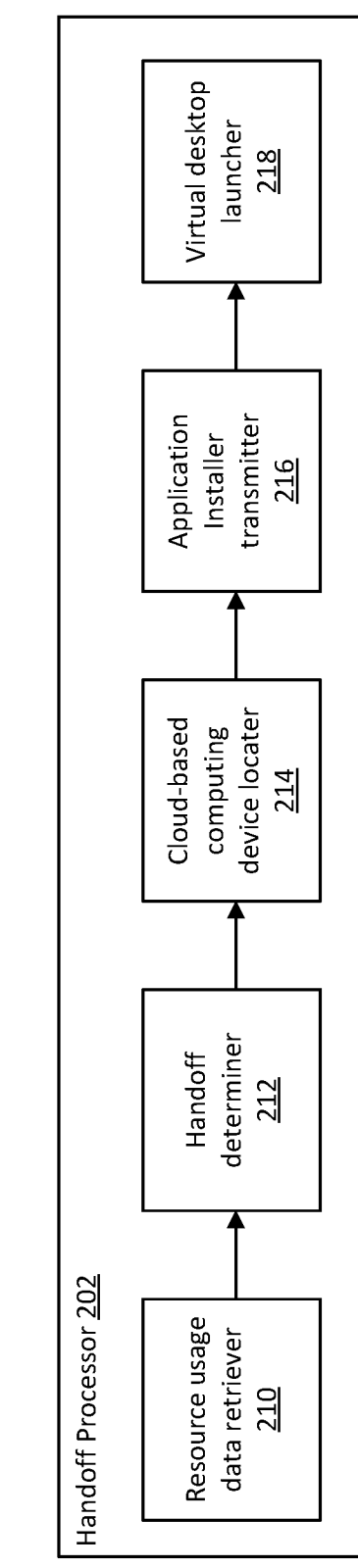
Figure 2B:
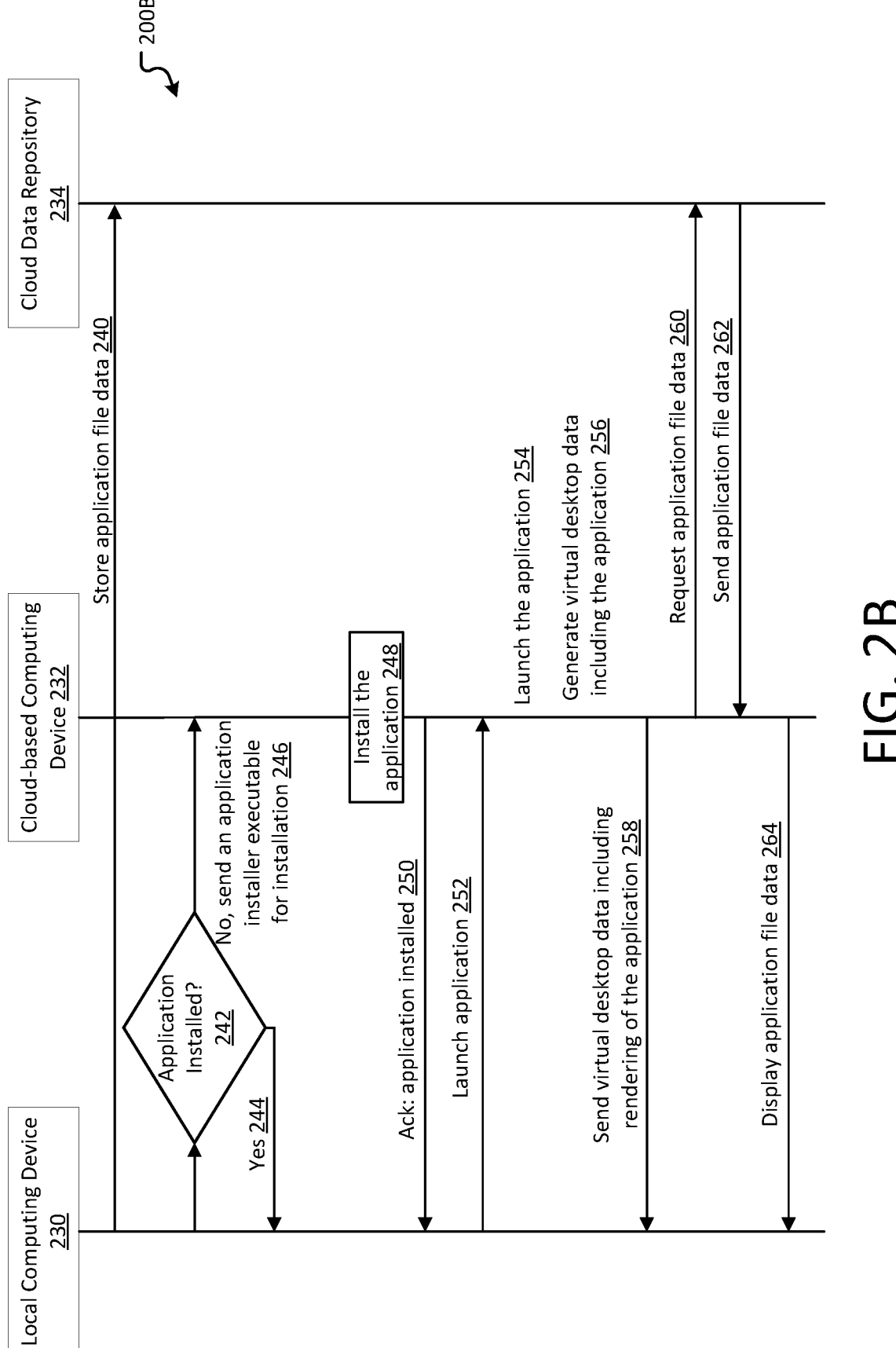

FIGS. 2A-B illustrate an overview of an example system and an example flow diagram for a handoff of execution of an application from a local computing device to a cloud-based computing device in accordance with aspects of the present disclosure. FIG. 2A illustrates an overview of a system including a handoff processor. System 200A includes a handoff processor 202 (e.g., the handoff processor 124 as shown in FIG. 1). As detailed above, the handoff processor 202 determines whether to handoff the execution of an application from a local computing device to a cloud-based computing device based on a state of resource consumption and other conditions associated with the local computing device.

The handoff processor 202 includes resource usage data retriever 210, handoff determiner 212, cloud-based computing device locater 214, application installer transmitter 216, and virtual desktop launcher 218. In aspects, the handoff processor 202 executes on the local computing device but is not limited to such a configuration.

The resource usage data retriever 210 periodically retrieves resource usage data associated with the local computing device. Examples of the resource usage data include, but are not limited to, a workload level of one or more processors (e.g., a central processing unit, hardware accelerators), a status of a volatile memory, a status of a non-volatile memory (e.g., a hard disk, a solid-state disk, and the like), a workload of a graphical processing unit, remaining battery level, a status of network latency, a status of network connectivity (e.g., whether the connectivity is to an open public network), and the like. Additionally, or alternatively, the resource usage data retriever 210 retrieves the resource usage data in response to receiving a predetermined event, such as an error event associated with one resources described above. Examples may include CPU usage or HDD speed warnings or errors, or the like. Those skilled in the art may understand what events cause the retrieving to occur, and/or create rules to define the events.

The handoff determiner 212 determines whether to initiate a handoff of the execution of an application on the local computing device to an application on the cloud-based computing device. For example, the handoff determiner 212 determines that a handoff should be initiated when the resource usage data indicates insufficient resources available to execute the application on the local computing device. In examples, the handoff determiner 212 notifies a user of the handoff by displaying a notification on the local computing device. After receiving an acknowledgement and/or an instruction from the user to proceed with the handoff, the handoff processor 202 proceeds to connect with a cloud-based computing device for handoff.

The cloud-based computing device locater 214 locates the cloud-based computing device. In embodiments, the location of the cloud-based computing device is predefined or otherwise known to the local computing device. In other embodiments, other methods may be implemented including user provided location information and login credentials to the cloud-based computing device. The cloud-based computing device locater 214 then starts communicating with the cloud-based computing device 104 to inquire whether the application or suitable equivalent has already been installed on the cloud-based computing device 104. In aspects, the cloud-based computing device locater 214 notifies the cloud-based computing device 104 that the handoff operation is initiating.

When the cloud-based computing device indicates that the application or suitable equivalent has not been installed on the cloud-based computing device, the application installer transmitter 216 transmits an application installer executable to the cloud-based computing device. In particular, when the local computing device stores the application installer executable (e.g., the application installer executable 112 as shown in FIG. 1), the application installer transmitter 216 retrieves and transmits the locally-stored application installer executable to the cloud-based computing device 104, e.g., as a part of the handoff operations. Additionally, or alternatively, the application installer transmitter 216 may instruct the cloud-based computing device to download an application installer executable directly from a cloud application store (e.g., the cloud application store 108 as shown in FIG. 1) over the network. The transmission and/or the instruction causes the cloud-based computing device to install the application on the cloud-based computing device.

The virtual desktop launcher 218 launches and displays on the local computing device a virtual desktop (e.g., a remote desktop) that is associated with the cloud-based computing device. In aspects, the operating system of the cloud-based computing device launches the installed application. The operating system of the cloud-based computing device further generates the virtual desktop including the application running on the cloud-based computing device for interactive display in the local computing device. The handoff operations complete when the user begins using the application on the virtual desktop on the local computing device.

FIG. 2B illustrates an example flow diagram for the handoff operations from an application on a local computing device to an application on a cloud-based computing device in accordance with aspects of the present disclosure. In particular, the example flow diagram 200B illustrates a series of steps, from storing application file data used in an application on the local computing device to displaying the application file data in a virtual desktop from the application executing on the cloud-based computing device after the handoff operations.

In examples, the flow diagram 200B includes processing by each of local computing device 230, cloud-based computing device 232, and cloud data repository 234. The local computing device 230 stores (240) the application file data in the cloud data repository 234. In an example, the application may be a drawing application and the application file data may relate to user-specific canvas data associated with the application. The canvas data may represent image data being edited, for example, on the local computing device. To proceed with the handoff operations, the local computing device 230 determines (242) whether the application has been installed on the cloud-based computing device. The step 242 of determining if the application is installed may involve a request for information to the cloud-based computing device. The cloud-based computing device 232 may indicate that the application is installed (244) or not installed (246) on the cloud-based computing device.

If the application is not installed, then the local computing device 230 may send (246) an application installer executable to the cloud-based computing device 232 for installation (248). In aspects, the application installer executable may be in a packaging format that offers a delivery of the application to both a physical machine and a virtual machine (e.g., a remote machine in the cloud). For example, use of the common packaging format enables a central authority to simplify installation of the application on the cloud-based computing device. Moreover, different cloud-based computing devices may include distinct resource configurations. The packaging format helps the central authority to centrally manage the installation of applications across the different cloud-based computing devices. As will be appreciated, a version of an application associated with the application installer executable may be the same as a version of an application running on the local computing device.

After receiving the application installer executable and installs the applications (248), the cloud-based computing device 232 sends (250) an acknowledge message to the local computing device. The acknowledge message acknowledges installation of the application on the cloud-based computing device.

Upon determining the application is installed (244) or (250) the local computing device 230 then instructs (252) the cloud-based computing device 232 to launch the application on the cloud-based computing device. Additionally, or alternatively, the instruction to launch the application, including a specific version thereof, may be included as a part of the step to send (246) the application installer executable to the cloud-based computing device 232.

The cloud-based computing device 232 launches (254) the application on the cloud-based computing device 232 and generates (256) virtual desktop including rendering of interactive data associated with the application. The cloud-based computing device 232 sends (258) the virtual desktop to the local computing device 230.

Either automatically or through manual operation by the user using the application through the virtual desktop, the cloud-based computing device 232 sends (260) a request for the application file data to the cloud data repository 234. In response to receiving the request, the cloud data repository 234 sends (262) the application file data that has been stored in the cloud data repository 234 to the cloud-based computing device 232. The cloud-based computing device 232 updates (264) the display of the application in the virtual desktop by loading the application file data. Accordingly, the user using the local computing device is enabled to resume operating on the application file data in the application that is executed on the cloud-based computing device.

As should be appreciated, operations 240-264 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 3 illustrates an example data structure associated with monitoring resource states of a local computing-device in accordance with aspects of the present disclosure. In examples, monitored resources 300 include processor status 302, volatile memory status 304, non-volatile memory status 336, workload of graphics processing unit 308, remaining battery level 310, network latency status 312, and network connectivity state 314.

The processor status 302, in an embodiment, indicates the current status of the workload any or all processors including, for example, a central processing unit and co-processors in the local computing device. The example indicates 75% as the current status, which may indicate that 75% of the processor capacity is being consumed. The volatile memory status 304 indicates a consumption percentage (e.g., 75%) of volatile memory including random access memory of the local computing device. The non-volatile memory status 306 indicates a consumption percentage (e.g., 75%) of a non-volatile memory of the local computing device. The status represents a level of or remaining space in the non-volatile memory (e.g., a hard disk, a solid-state device, and the like). Other resources related to the memory may also be monitored, such as the current latency (not shown) of reading and/or writing data in the non-volatile memory in the local computing device. A workload of graphics processing unit indicates a workload level (e.g., 75%) on the graphical processing unit and other hardware accelerators in the local computing device.

In addition to workloads and resource consumption levels of various hardware on the local computing device, the monitored resources include a remaining battery level 310 (20%), a network latency status 312 ("High"), and a network connectivity state 314 (e.g., "OPEN") to the network (e.g., a Wi-Fi network or a landline network). Those skilled in the art will appreciate that other resources may be monitored and the values indicating status may incorporate different types of labels, such as "high", "medium" and "low" instead of percentage values.

Values of the statuses that are above respective predetermined thresholds may be an indication of a need or recommendation to handoff execution of at least one application to a corresponding application on the cloud-based computing device. In aspects, some of statuses of the monitored resources indicate it is more suitable to continue using an application on the local computing device, while other statuses of the monitored resources may indicate it is more suitable to use the application on the cloud-based computing device through the handoff operations. For example, the handoff determiner may determine that the application should be used on the cloud-based computing device when a performance issue surfaces on the local computing device, e.g., because of high resource utilizations and/or slow speeds in accessing processors and memories. Other reasons for the handoff may include when the local computing device is connecting to an open (e.g., public) network, e.g., causing data security issues, and/or a battery level of the local computing device is low. In contrast, use of the application on the local computing device is preferable as compared to a use of the application on the cloud-based computing device when a network latency is relatively high or when the local computing device is disconnected from a network.

Figure 4A:
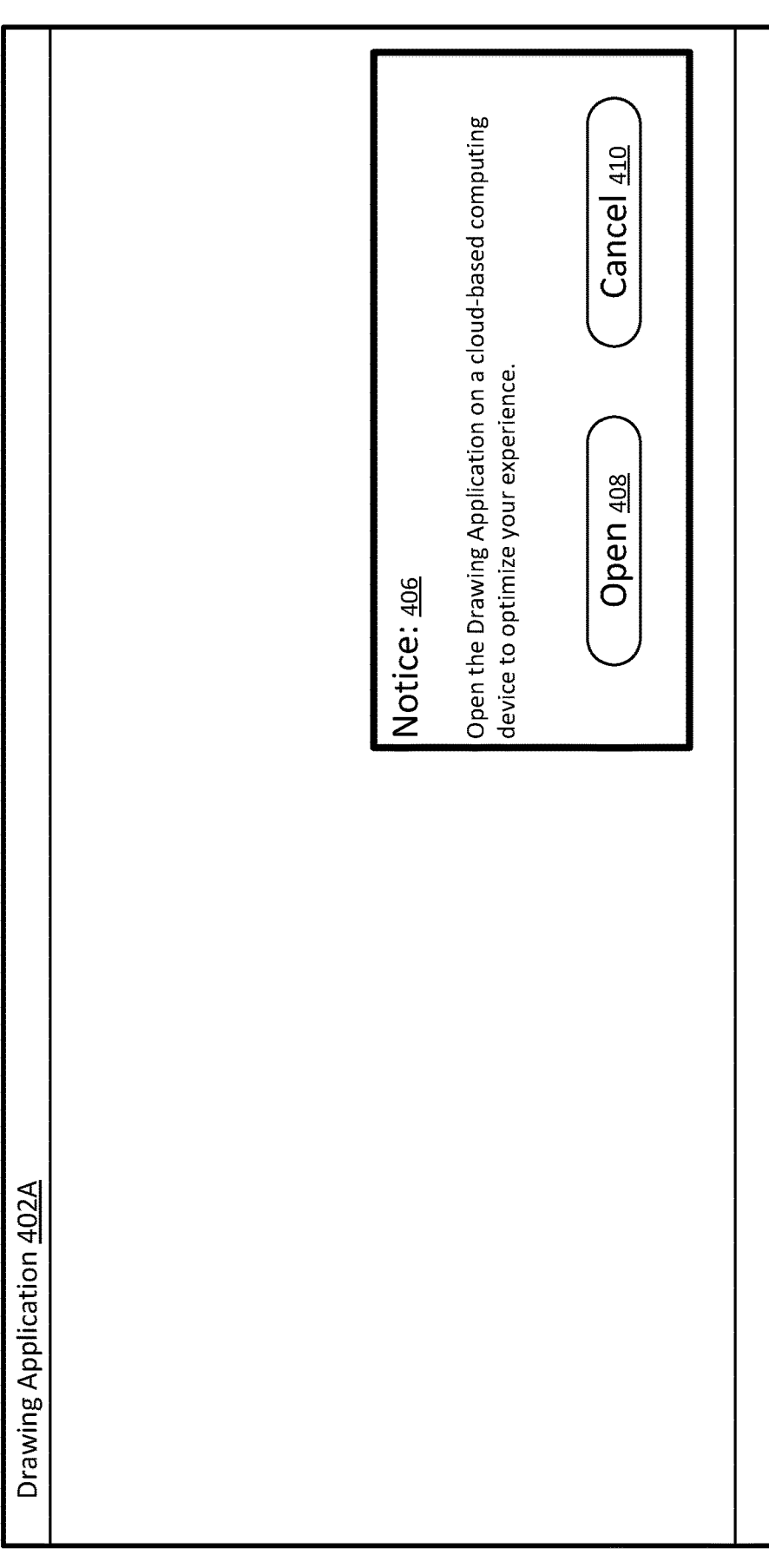
Figure 4B:
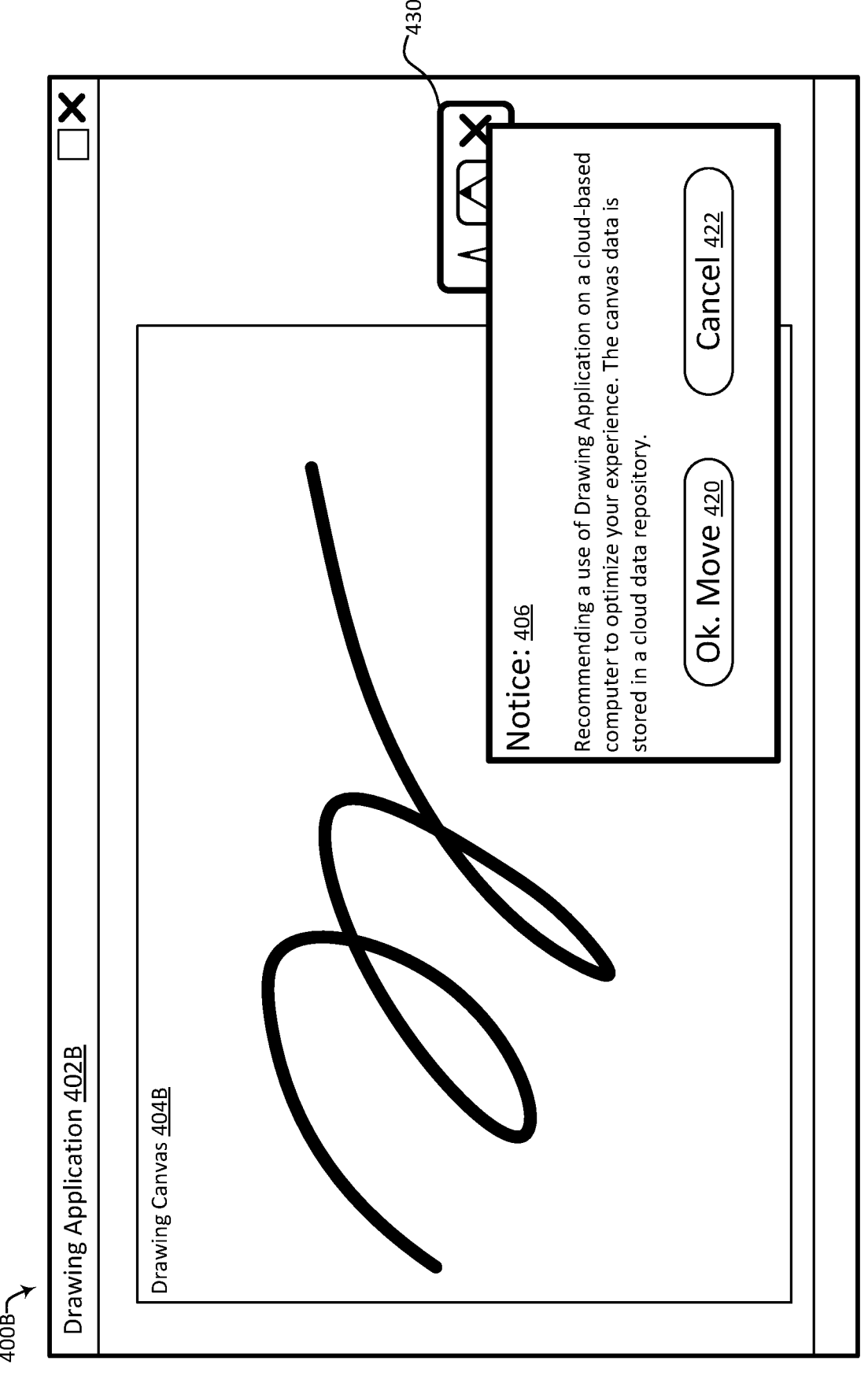
Figure 4C:
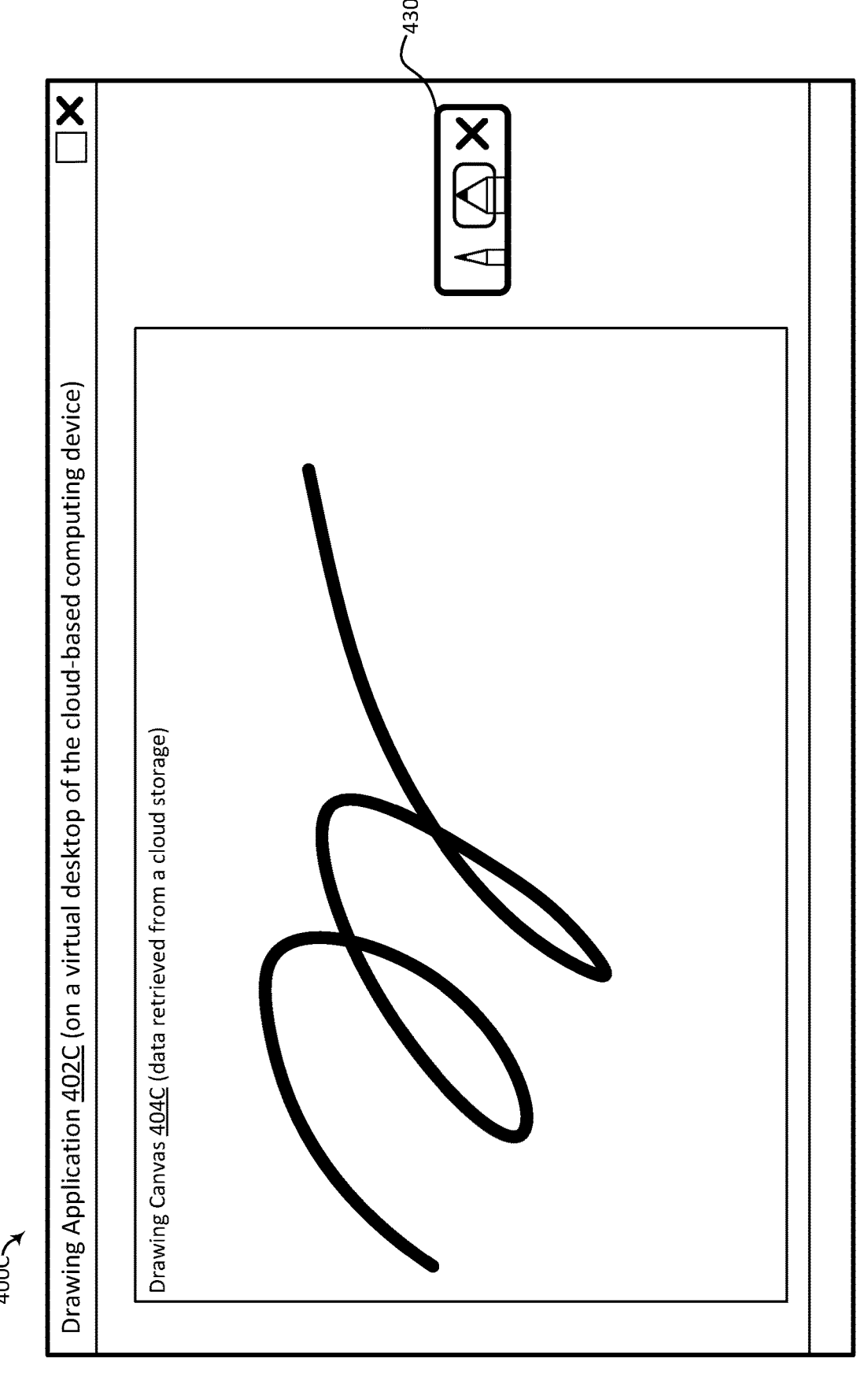

FIGS. 4A-C illustrate example user interfaces for a handoff of the execution of an application from a local computing device to a cloud-based computing device in accordance with aspects of the present disclosure. FIG. 4A illustrates an example user interface of a local computing device. The graphical user interface 400A displays a desktop and a notice 406. When a user of the local computing device requests opening or launching an application (e.g., an image drawing application), the local computing device determines whether to use a corresponding application on a cloud-based computing device instead of on the local computing device based on resource constraints in the local computing device. The notice 406 indicates "Open the Drawing Application on a cloud-based computing device to optimize your experience." The notice 406 further displays an "Open" button 408 and a "Cancel" button 410. The user selects the "Open" button 408 to instruct the local computing device to initiate the handoff operations to launch the application on the cloud-based computing device. If the user selects "Cancel" then the handoff does not take place and the application is launched on the local computing device.

FIG. 4B illustrates an example user interface of the local computing device. The user interface 400B includes a window associated with Drawing Application 402B running on the local computing device. The Drawing Application 402B further indicates drawing canvas 404B and selectable buttons 430B for drawing data on the drawing canvas 404B. The drawing canvas 404B indicates an example image drawing. In examples, the local computing device determines that the resource constraints of the local computing device necessitate or recommend the handoff of the execution of the Drawing Application from the local computing device to the cloud-based computing device. Accordingly, the local computing device displays a notice 406.

The notice 406 indicates "Recommending a use of Drawing Application on a cloud-based computer to optimize your experience. The canvas data is stored in a cloud data repository." The notice 406 further includes a "Ok. Move" button 420 and a "Cancel" button 422. When the user selects the "Ok. Move" button 420, the local computing device initiates the handoff operations to launch Drawing Application (e.g., installing the application if the application is not installed) on the cloud-based computing device.

Selecting the "Cancel" button 410 will cause the application to continue operating in its current environment. In embodiments, the selection of "Cancel" 410 may cause the monitoring for handoff determinations to cease. In other embodiments, the notice 406 may reappear after the next cycle if the resource usage status indicates a handoff would be preferred. In yet other embodiments, the user can control when and how often the determination is made to control the appearance of the notice 406 following selection of the "Cancel" button 410.

FIG. 4C illustrates an example user interface of a virtual desktop including the image drawing application after the handoff is completed in accordance with aspects of the present disclosure. The virtual desktop 400C is displayed on the local computing device. The virtual desktop 400C includes a window associated with Drawing Application 402C. Drawing Application is executed in an operating system associated with the virtual machine of the cloud-based computing device. The Drawing Application 402C includes drawing canvas 404C that has been retrieved from the cloud data repository (e.g., the cloud data repository 106 as shown in FIG. 1) and selectable buttons 430B for drawing items. As indicated in the virtual desktop 400C, the user using the local computing device interactively operates Drawing Application that runs on the cloud-based computing device. In embodiments, there is a visual indicator signifying the application is executing on the cloud-based computing device. In other embodiments there is no indicator. In yet other embodiments, a user may configure the device to allow for such visual indicators or not. While not shown, there may a user control to allow them to return to operation within the application on the local computing device and essentially force a handoff back from the cloud computing device.

In embodiments, when the application window is presented, e.g., application 404C, the drawing application may be closed locally, as may be appreciated from FIG. 4C. Other embodiments are contemplated, however, where the local application may remain open during and after the handoff occurs. Further, it is contemplated that the user may choose to either close the local application or not and/or configure the local computing device to either close the local application or not by default.

Figure 5A:
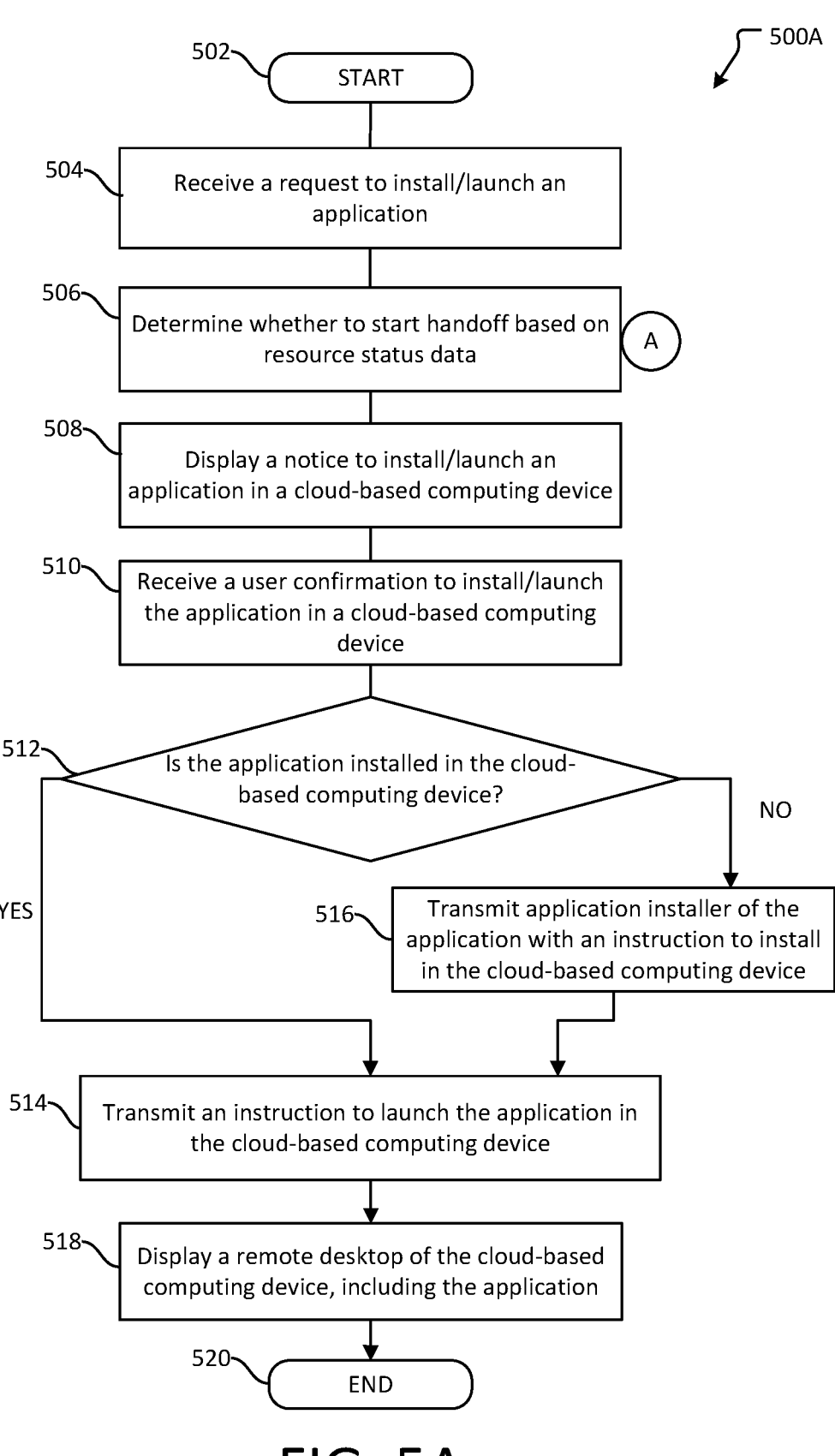
Figure 5B:
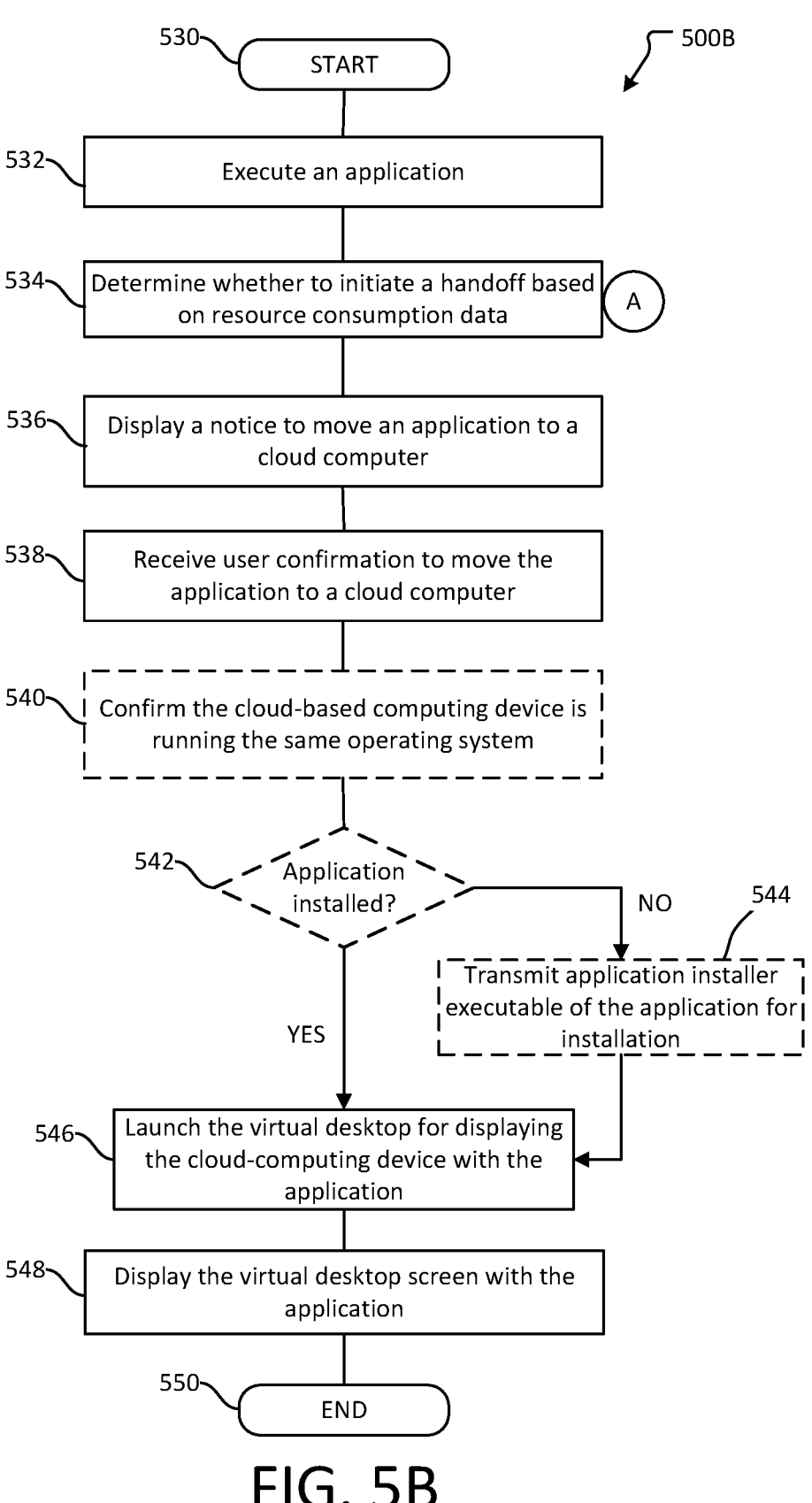
Figure 5C:
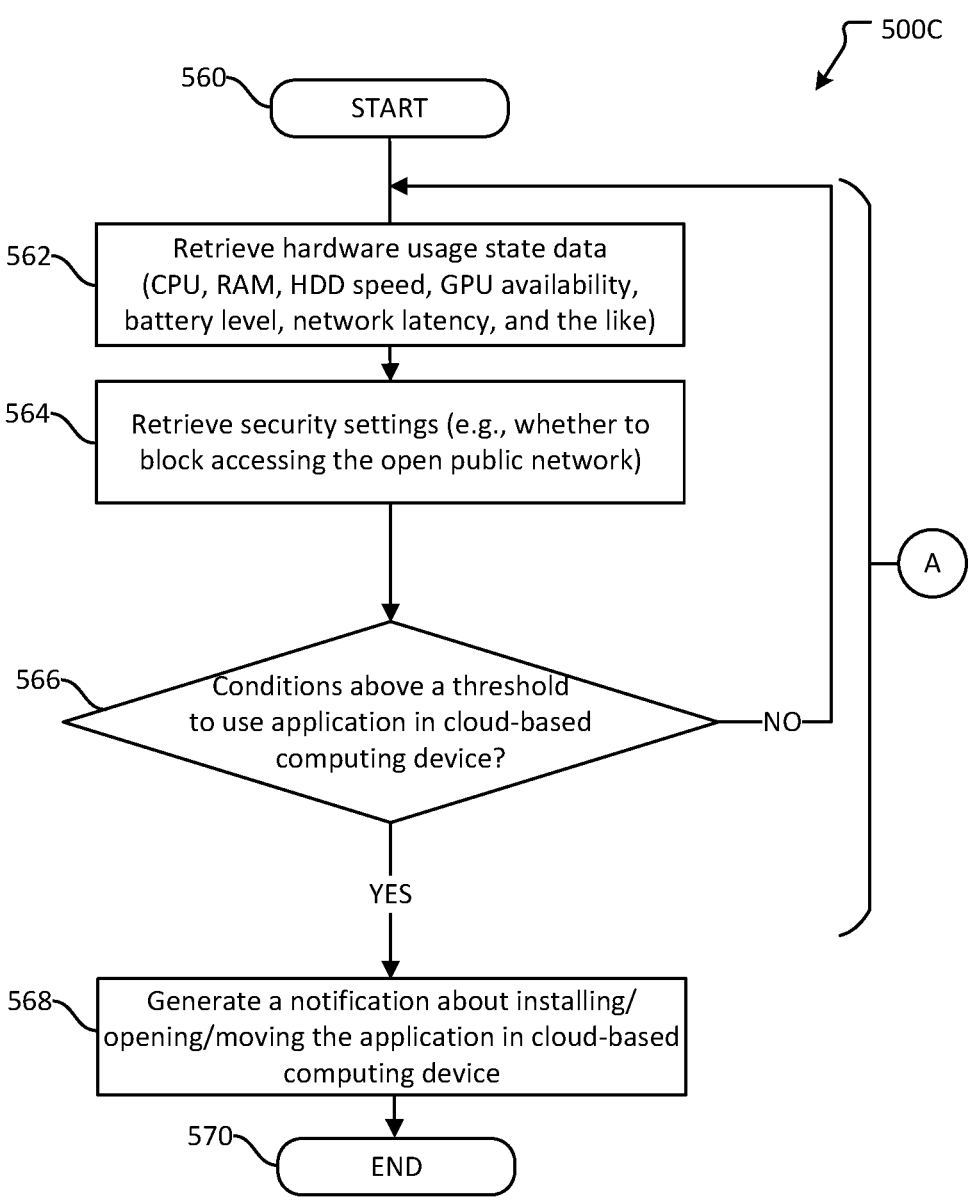

FIGS. 5A-C illustrate examples of methods for a handoff of an application from a local computing device to a cloud-based computing device in accordance with aspects of the present disclosure. A general order of the operations for the method 500A for a handoff of an application is shown in FIG. 5A. In particular, the method 500A indicates the handoff operations that occur when the application is being launched or installed on the local computing device. Generally, the method 500A begins with start operation 502. The method 500A may include more or fewer steps or may arrange the order of the steps differently than those shown in FIG. 5A. The method 500A can be executed as a set of computer-executable instructions executed by a computer system and encoded or stored on a computer readable medium. Further, the method 500A can be performed by gates or circuits associated with a processor, an ASIC, an FPGA, a SOC or other hardware device. Hereinafter, the method 500A shall be explained with reference to the systems, components, devices, modules, software, data structures, data characteristic representations, signaling diagrams, methods, etc., described in conjunction with FIGS. 1, 2A-2B, 3, 4A-4C, 5B-5C, 6, and 7A-7B.

Following start operation 502, the method 500A begins with receive operation 504, in which a request to install or launch an application is received by the local computing device. In aspects, the user inputs the request via the desktop user interface of the local computing device.

At determine operation 506, whether to initiate a handoff is determined based on status data associated with resources available on the local computing device. In aspects, the determine operation 506 includes monitoring statuses of a predetermined set of resources on the local computing device. More detailed description of the determine operation 506 marked as "A" is as detailed below.

At display a notice operation 508, a notice (e.g., the notice 406 as shown in FIG. 4A for opening the application) to install or launch the application is displayed on the local computing device. In aspects, the notice seeks an approval and/or instruction from the user of the local computing device to initiate the handoff operations. When the user selects the "cancel" button of the notice, the local computing device continues to run the application locally, despite the insufficient resources and/or issues associated with using the application in the local computing device.

At receive a user confirmation operation 510, a user may provide and the system will receive a confirmation to install or launch the application on the cloud-based computing device. In aspects, receiving a selection of a button for proceeding as indicated in the notification (e.g., the "Open" button 408 as shown in FIG. 4A) corresponds to receiving the user confirmation to install or launch the application in the cloud-based computing device.

At a decision operation 512, whether the application is installed on the cloud-based computing device is confirmed. In aspects, the local computing devices inquires as to a status of the application on the cloud-based computing device. The cloud-based computing device responds to the inquiry accordingly.

When the application is installed on the cloud-based computing device, at transmit an instruction operation 514, an instruction to launch the application on the cloud-based computing device is transmitted from the local computing device to the cloud-based computing device. In aspects, the instruction includes specifying a launch of an application that is the same application with the same version as the application was to be installed or launched in the local computing device.

When the application is not installed on the cloud-based computing device, at transmit operation 516, an application installer is transmitted to the cloud-based computing device, along with an instruction to install the application. When the application is installed on the cloud-based computing device or after completing installation of the application on the cloud-based computing device, the method 500A proceeds to transmit instruction operation 514, where an instruction to launch the application on the cloud-based computing device is transmitted from the local computing device to the cloud-based computing device, as discussed above.

Following transmit operation 514 method 500A proceeds to display a virtual desktop at operation 518. At the display a virtual desktop operation 518, the virtual desktop including the application is displayed on the local computing device. The user of the local computing device may begin using the application that is running on the cloud-based computing device. The method 500A ends with the end operation 520.

As should be appreciated, operations 502-520 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 5B illustrates an example of a method for handing off an application from a local computing device to a cloud-based computing device in accordance with aspects of the present disclosure. A general order of the operations for the method 500B is shown in FIG. 5B. Generally, the method 500B begins with start operation 530. The method 500B may include more or fewer steps or may arrange the order of the steps differently than those shown in FIG. 5B. The method 500B can be executed as a set of computer-executable instructions executed by a computer system and encoded or stored on a computer readable medium. Further, the method 500B can be performed by gates or circuits associated with a processor, an ASIC, an FPGA, a SOC or other hardware device. Hereinafter, the method 500B shall be explained with reference to the systems, components, devices, modules, software, data structures, data characteristic representations, signaling diagrams, methods, etc., described in conjunction with FIGS. 1, 2A-2B, 3, 4A-4C, 5A, 5C, 6, and 7A-7B.

Following start operation 530, the method 500B begins with execute operation 532, in which an application (e.g., Drawing Application 402 as shown in FIG. 4B) is executed on the local computing device.

At determine operation 534, whether to initiate a handoff of the execution of the application is determined based on status data associated with resources on the local computing device. In aspects, the determine operation 504 includes monitoring statuses of a predetermined set of resources on the local computing device. More detailed description of the determine operation 504 as marked as "A" is as detailed below.

At display a notice operation 536, a notice (e.g., the notice 406 as shown in FIG. 4B) to move use of the application is displayed on the local computing device. In aspects, the notice seeks an approval and/or an instruction by the user of the local computing device to initiate the handoff operations. When the user selects the "cancel" button of the notice, the local computing device continues to run the application locally, despite the insufficient resources and/or issues associated with using the application in the local computing device.

At receive user confirmation operation 538, a user confirmation to move usage of the application from the local computing device to the cloud-based computing device is received. In aspects, receiving a selection of a button for proceeding as indicated in the notice (e.g., the "Ok. Move" button 420 as shown in FIG. 4B) corresponds to receiving the user confirmation to move usage of the application to the cloud-based computing device.

At optional confirm operation 540, whether the cloud-based computing device runs the same or other suitable operating system as the operating system on the local computing device is optionally confirmed. Other suitable operating systems may involve those operating systems that provide compatibility with the application, e.g., application 122 discussed above. The confirm operation 540 ensures that the same application running on the local computing device can be executed on the cloud-based computing device.

At optional determination operation 542, a determination is made whether the application is installed on the cloud-based computing device. The process of determining whether it is installed is similar, if not the same, as the determination operation 512 discussed above in conjunction with FIG. 5A. If the application is not installed on the cloud-based computing device, flow branches NO to transmit operation application installer operation 544 where an executable is transmitted from the local computing device to the cloud-based computing device. That is, if the application is not installed on the cloud-based computing device execut-able can be used by the cloud-based computing device to install the application on the cloud-based computing device. Additionally, or alternatively, the cloud-based computing device may download the application installer executable from a cloud application storage and install the application accordingly. Those skilled in the art will appreciate that other methods and steps may be used to cause the installa-tion of the application.

Next, at launch operation 546, the virtual desktop is launched on the local computing device for displaying the cloud-based computing device including the application.

At display the virtual desktop operation 548, the virtual desktop including the application running on the cloud-based computing device is displayed on the local computing device. Accordingly, the user of the local computing device may continue using the application by interactively operat-ing the application on the virtual desktop on the local computing device. The method 500B ends with the end operation 550.

As should be appreciated, operations 530-550 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

FIG. 5C illustrates an example method for determining the handoff operations to take place in accordance with aspects of the present disclosure. A general order of the operations for the method 500C is shown in FIG. 5C. Generally, the method 500C begins with start operation 560. The method 500C may include more or fewer steps or may arrange the order of the steps differently than those shown in FIG. 5C. The method 500C can be executed as a set of computer-executable instructions executed by a computer system and encoded or stored on a computer readable medium. Further, the method 500C can be performed by gates or circuits associated with a processor, an ASIC, an FPGA, a SOC or other hardware device. Hereinafter, the method 500C shall be explained with reference to the systems, components, devices, modules, software, data structures, data characteristic representations, signaling dia-grams, methods, etc., described in conjunction with FIGS. 1, 2A-2B, 3, 4A-4C, 5A-5B, 6, and 7A-7B.

Following start operation 560, the method 500B begins with retrieve hardware usage state data operation 562, in which hardware usage state data is retrieved on the local computing device. In aspects, the hardware usage state data include status data associated with a central processing unit and co-processors, a random-access memory, a latency of accessing a hard disk and/or a solid-state device, availability of processing resources at graphics processing unit and other hardware accelerators, a remaining battery level, network latency, connectivity to a secure (or open) network, and the like.

At retrieve security settings operation 564, security set-tings of the local computing device are retrieved. The security settings may include a set of predefined rules on when and whether to block access to a network, such as a public network that lacks sufficient security. The method 500C retrieves the security settings and checks against the current state of the local computing device to ensure it is in compliance with the set of predefined rules. Those skilled in the art will appreciate how such settings can be retrieved and checked to allow or prevent certain actions from occurring.

At decision operation 566, the method determines whether to recommend executing an application (e.g., the handoff operations) on the cloud-based computing device. The decision operation 566 determines whether to make such a recommendation based on the retrieved statuses of various resources and network connectivity of the local computing device. For example, when the local computing device indicates insufficient resources available for execut-ing the application (e.g., installing, opening, or using an application, such as the image drawing application), the decision operation 566 may recommend using the applica-tion on the cloud-based computing device. In contrast, when the local computing device is disconnected from the net-work, the decision operation 566 may not recommend initiating the handoff operations because the lack of access to the network makes it not feasible to access and use the application on the cloud-based computing device. In aspects, the decision operation 566 includes comparing the statuses of the respective resources against a set of predetermined thresholds. Examples of the set of predetermined thresholds include a maximum utilization percentage of memory, a maximum latency for accessing the hard disk, maximum workloads on the graphics processing unit, a minimum level of resources needed for executing an application, and the like.

When the decision operation 566 determines to initiate the handoff operations to use an application on the cloud-based computing device, the method 500C proceeds to generate operation 568, in which a notification about installing or launching the application on, or moving the application to, the cloud-based computing device is generated. The method 500C ends with the end operation 570.

As should be appreciated, operations 560-570 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 6:
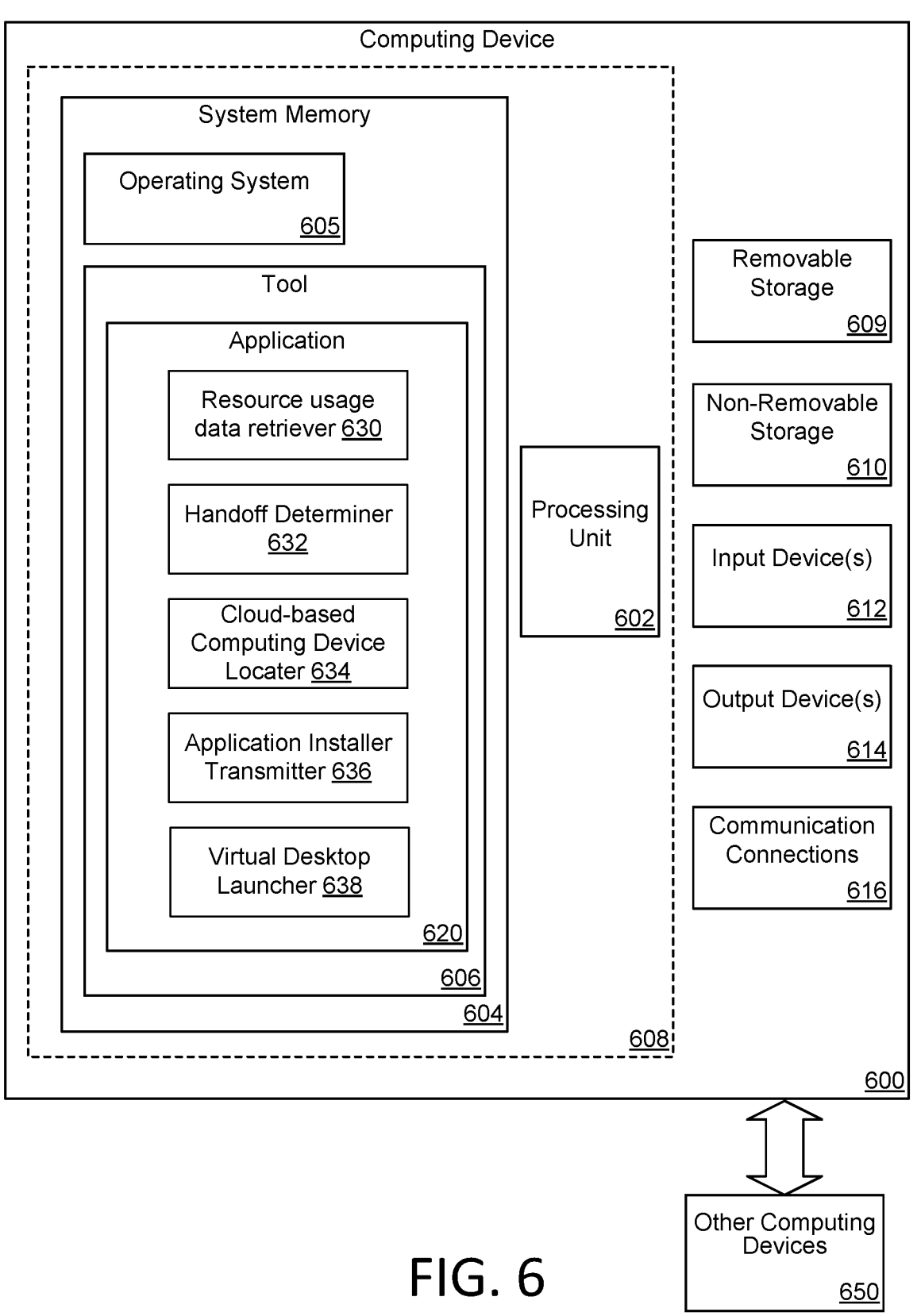
FIG. 6 is a block diagram illustrating example physical components of a computing device with which aspects of the disclosure may be practiced.

FIG. 6 is a block diagram illustrating physical compo-nents (e.g., hardware) of a computing device 600 with which aspects of the disclosure may be practiced. The computing device components described below may be suitable for the computing devices described above. In a basic configura-tion, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclo-sure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include addi-tional data storage devices (removable and/or non-remov-able) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes resource usage data retriever 630, handoff determiner 632, cloud-based computing device locater 634, application installer transmitter 636, and virtual desktop launcher 638 as described in more details in FIG. 2. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7A:
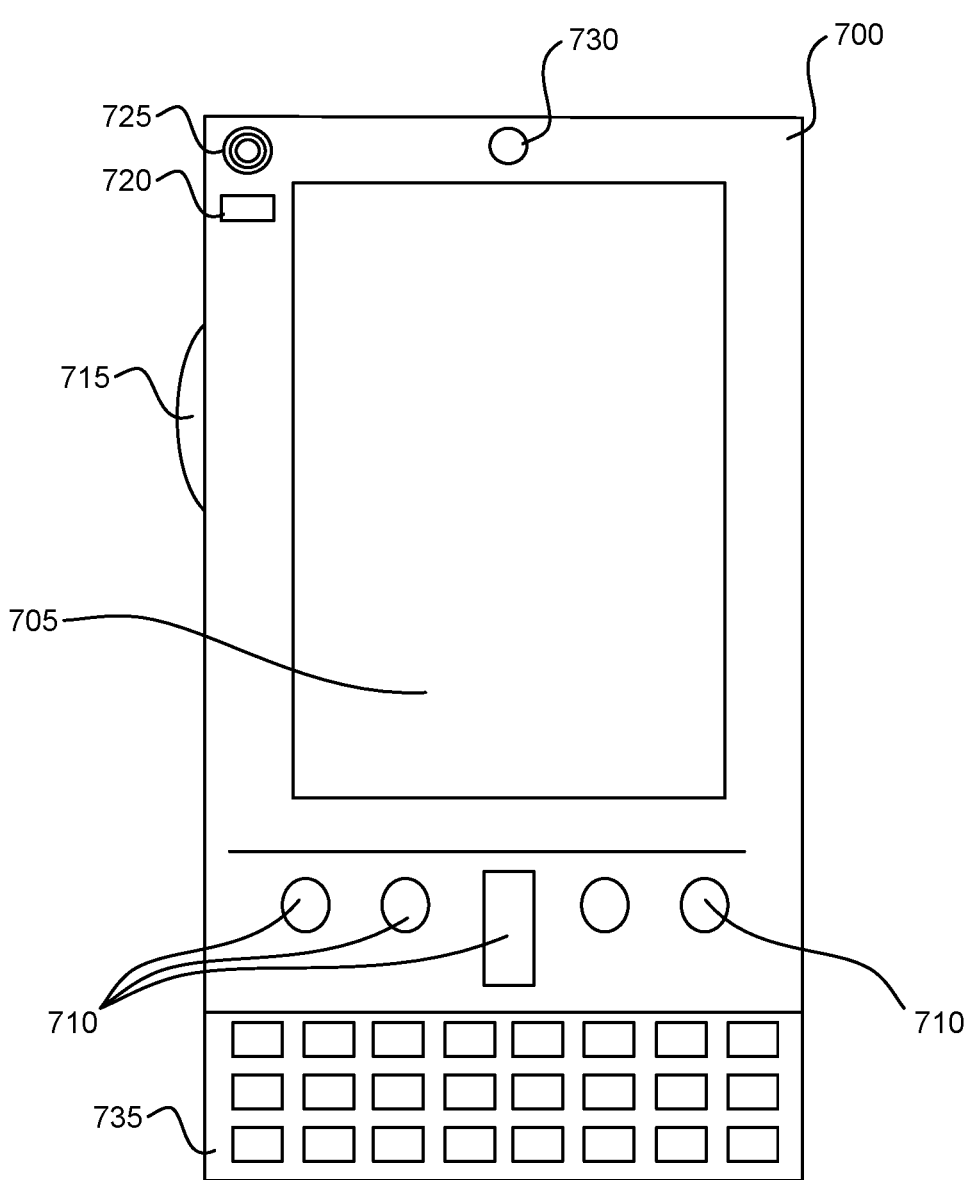
FIG. 7A is a simplified diagram of a mobile computing device with which aspects of the present disclosure may be practiced.
Figure 7B:
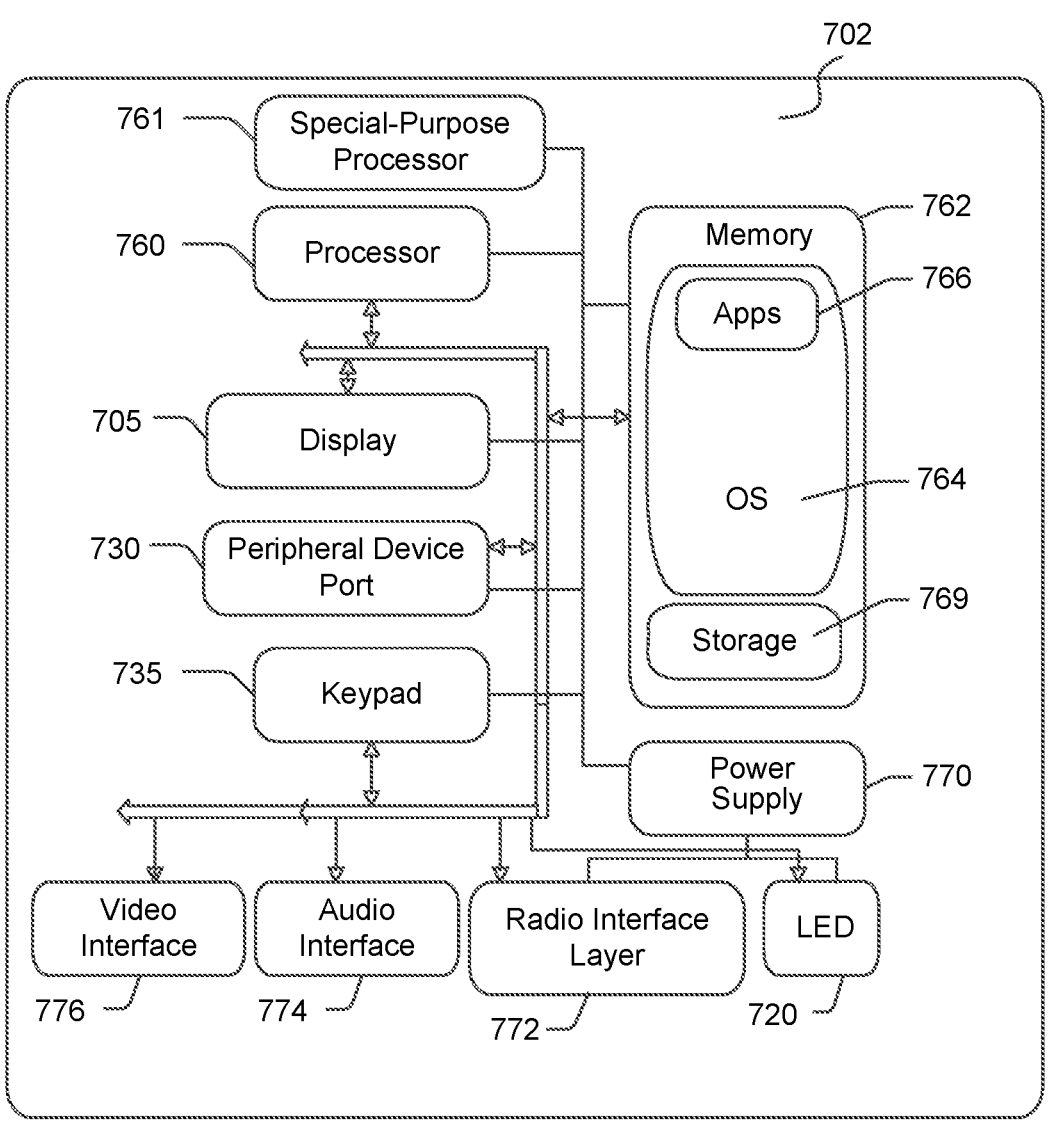
FIG. 7B is another simplified block diagram of a mobile computing device with which aspects of the present disclosure may be practiced.

FIGS. 7A and 7B illustrate a computing device or mobile computing device 700, for example, a mobile telephone, a smart phone, wearable computer (such as a smart watch), a tablet computer, a laptop computer, and the like, with which aspects of the disclosure may be practiced. In some aspects, the client utilized by a user (e.g., the local computing device 102 as shown in the system 100 in FIG. 1) may be a mobile computing device. With reference to FIG. 7A, one aspect of a mobile computing device 700 for implementing the aspects is illustrated. In a basic configuration, the mobile computing device 700 is a handheld computer having both input elements and output elements. The mobile computing device 700 typically includes a display 705 and one or more input buttons 710 that allow the user to enter information into the mobile computing device 700. The display 705 of the mobile computing device 700 may also function as an input device (e.g., a touch screen display). If included as an optional input element, a side input element 715 allows further user input. The side input element 715 may be a rotary switch, a button, or any other type of manual input element. In alternative aspects, mobile computing device 700 may incorporate more or less input elements. For example, the display 705 may not be a touch screen in some aspects. In yet another alternative aspect, the mobile computing device 700 is a portable phone system, such as a cellular phone. The mobile computing device 700 may also include an optional keypad 735. Optional keypad 735 may be a physical keypad or a "soft" keypad generated on the touch screen display. In various aspects, the output elements include the display 705 for showing a graphical user interface (GUI), a visual indicator 720 (e.g., a light emitting diode), and/or an audio transducer 725 (e.g., a speaker). In some aspects, the mobile computing device 700 incorporates a vibration transducer for providing the user with tactile feedback. In yet another aspect, the mobile computing device 700 incorporates input and/or output ports, such as an audio input (e.g., a microphone jack), an audio output (e.g., a headphone jack), and a video output (e.g., a HDMI port) for sending signals to or receiving signals from an external device.

FIG. 7B is a block diagram illustrating the architecture of one aspect of computing device, a server (e.g., the cloud-based computing device 104 as shown in FIG. 1), a mobile computing device, etc. That is, the mobile computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 868 synchronized with corresponding information stored at the host computer. As should be appreciated, other applications may be loaded into the memory 762 and run on the mobile computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A mobile computing device 700 implementing the system 702 may have additional features or functionality. For example, the mobile computing device 700 may also include additional data storage devices (removable and/or non-removable) such as, magnetic disks, optical disks, or tape. Such additional storage is illustrated in FIG. 7B by the non-volatile storage area 768.

Data/information generated or captured by the mobile computing device 700 and stored via the system 702 may be stored locally on the mobile computing device 700, as described above, or the data may be stored on any number of storage media that may be accessed by the device via the radio interface layer 772 or via a wired connection between the mobile computing device 700 and a separate computing device associated with the mobile computing device 700, for example, a server computer in a distributed computing network, such as the Internet. As should be appreciated such data/information may be accessed via the mobile computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for handing off usage of an application to a cloud-based computing device according to at least the examples provided in the sections below.

Any of the one or more above aspects in combination with any other of the one or more aspect. Any of the one or more aspects as described herein.

What is claimed is:

1. A computer implemented method for handing off execution of an application from a first computing device to a second computing device, the first computing device comprising a local computing device, and the second computing device comprising a remote computing device, the method comprising:

creating, based on resource consumption data associated with the first computing device, a computer-executable instruction, the computer-executable instruction comprising an instruction to handoff execution of a first application from the first computing device to the second computing device, the handoff execution further comprising launching a second application on the second computing device;

transmitting, by the first computing device, the computer-executable instruction to execute the computer-executable instruction to initiate the handoff execution on the second computing device to install and launch the second application on the second computing device;

receiving output of the second application from the second computing device over a network; and displaying, on a display of the first computing device, an output of the first application and further updating the displayed output by displaying a remote desktop, the remote desktop representing the received output of the second application being executed on the second computing device.

2. The computer implemented method of claim 1, further comprising:

prior to determining to initiate the handoff execution of the first application on the first computing device to the second computing device, receiving a request to launch the first application on the first computing device.

3. The computer implemented method of claim 1, wherein the resource consumption data includes at least one of:

a utilization rate of a processor on the first computing device, a latency of accessing a non-volatile memory on the first computing device, or a latency of communication over the network.

4. The computer implemented method of claim 1, further comprising:

prior to handing off execution of the first application, generating a notice of the handoff of the execution of the first application from the first computing device to the second computing device;

displaying the notice of the handoff; and receiving an input confirming that the execution of the first application is to be handed off from the first computing device to the second computing device.

5. The computer implemented method of claim 1, further comprising:

transmitting an application installer executable to the second computing device for installation.

6. The computer implemented method of claim 1, further comprising:

storing application file data associated with the first application in a cloud data repository; and terminating the first application on the first computing device after the remote desktop is displayed.

7. The computer implemented method of claim 1, wherein the second application corresponds to the first application, and wherein the second application is a cloud-based version of the first application.

8. The computer implemented method of claim 1, wherein the second computing device is accessible from the first computing device over the network through the remote desktop displayed on the first computing device.

9. The computer implemented method of claim 1, wherein the second computing device corresponds to a cloud-based computing device.

10. A system comprising:

a memory; and a processor configured to execute operations for handing off execution of an application from a first computing device to a second computing device, the first computing device comprising a local computing device, and the second computing device comprising a remote computing device, the operations comprising:

receiving a request to launch a first application on the first computing device;

launching the first application;

creating, based on resource consumption data associated with the first computing device, a computer-executable instruction, the computer-executable instruction comprising an instruction to handoff execution of the first application from the first computing device to the second computing device, the handoff further comprising launching a second application on the second computing device;

transmitting, by the first computing device, the computer-executable instruction to execute the computer-executable instruction to initiate the handoff execution on the second computing device to install and launch the second application on the second computing device;

receiving output of the second application from the second computing device over a network; and displaying, on a display of the first computing device, an output of the first application and further updating the displayed output by displaying a remote desktop, the remote desktop representing the received output of the second application being executed in the second computing device.

11. The system of claim 10, the processor further configured to execute operations comprising:

retrieving the resource consumption data associated with one or more resources on the first computing device, wherein the resource consumption data includes at least one of:

a utilization rate of the processor on the first computing device, a latency of accessing a non-volatile memory on the first computing device, or a latency of communication over the network; and determining, based on the resource consumption data and predetermined thresholds associated with resource consumption, whether to initiate the handoff of the execution of the first application from the first computing device to the second computing device.

12. The system of claim 10, the processor further configured to execute operations comprising:

retrieving an application installer executable;

transmitting the application installer executable to the second computing device for installation; and receiving data associated with the remote desktop including an indication that the second application being executed in the second computing device.

13. The system of claim 10, wherein the first application and the second application correspond to a same version of a same application.

14. The system of claim 10, wherein the second computing device corresponds to a cloud-based computing device.

* * * * *